Figure 1:
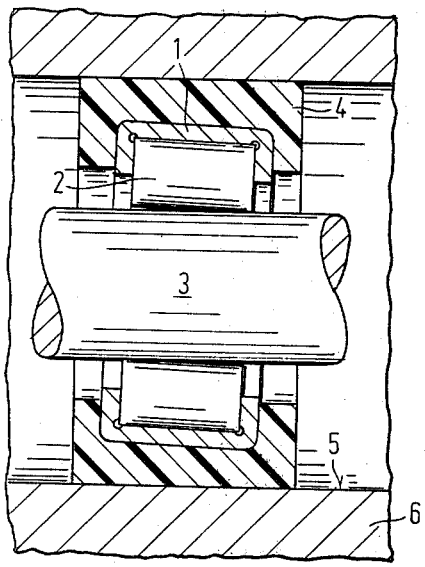

United States Patent [19]

Zielfleisch

[11] 4,223,962
[45] Sep. 23, 1980

[54] PLAY-FREE ROLLING BEARINGS FOR LOW LOADS AND LOW RPMS

[75] Inventor: Jörg Zielfleisch, Stuttgart, Fed. Rep. of Germany

[73] Assignee: Industriewerk Schaeffler OHG, Herzogenaurach, Fed. Rep. of Germany

[21] Appl. No.: 838,498

[22] Filed: Oct. 3, 1977

[30] Foreign Application Priority Data

Oct. 12, 1976 [DE] Fed. Rep. of Germany ....... 2645958

[51] Int. Cl.² .................. F16C 27/00; F16C 27/06
[52] U.S. Cl. .................. 308/184 R; 308/189 R; 308/207 R; 308/216; 308/236
[58] Field of Search .............. 308/3 R, 6, 184, 26, 308/35, 238, 187, 207, 216–218, 237 R, 237 A, , 214, 236, 72, 65, 66, 188, 189, 201

[56] References Cited

U.S. PATENT DOCUMENTS

| 3,115,373 | 12/1963 | Alexander | 308/72 |
| 3,883,194 | 5/1975 | Pitner | 308/184 R |
| 3,890,854 | 6/1975 | Pitner | 308/184 R X |

FOREIGN PATENT DOCUMENTS 2239149  2/1975  France ................................ 308/184 A Primary Examiner—Douglas C. Butler
Attorney, Agent, or Firm—Hammond & Littell, Weissenberger and Muserlian

[57] ABSTRACT

Play-free roller or slide bearings for low loads and low rpms comprising two structural elements carrying bearing surfaces that either cooperate in direct sliding relationship or have interposed between the bearing surfaces roller bearings, one structural element carrying one of the bearing surfaces is inclined to the other structural element so that the axes of both bearing surfaces are at an angle to each other.

12 Claims, 7 Drawing Figures

PLAY-FREE ROLLING BEARINGS FOR LOW LOADS AND LOW RPMS

STATE OF THE ART

Play-free slide or roller bearings may be used to support a shaft subject to low loads or rpms in an easy running way without producing a wobbling of the shaft when subjected to vibration effects and known constructions of this type solved the problem with an external bearing ring under the influence of an elastic component pushed inward either at several circumferential points or over the entire circumference to accomplish a play-free abutment against the roller bearings. Designs of this nature are acceptable but suffer the disadvantage that their external bearing rings require either a special type of deformation for their bearing function at specifically targeted circumferential areas or a slot-developed circumference to reduce their diameter. The first solution requires greater costs and the second solution irregularities of the rolling of the roller bearing can be easily produced at the joint abutment of the external bearing race.

OBJECTS OF THE INVENTION

It is an object of the invention to provide a novel play-free slide or roller bearing for low loads of simple construction and reduced costs.

This and other objects and advantages of the invention will become obvious from the following detailed description.

THE INVENTION

The novel play-free roller or slide bearing of the invention for low loads and low rpms is comprised of two structural elements carrying bearing surfaces that either cooperate in direct sliding relationship or have interposed between the bearing surfaces roller bearings, one structural element carrying one of the bearing surfaces is inclined to the other structural element so that the axes of both bearing surfaces are at an angle to each other.

With conventional bearings where two bearing surfaces communicate either directly by sliding contact or by contact through rollers between the said surfaces, the latter constantly retain a certain radial play. If the element of the invention carrying one bearing surface is so inclined to the other element that the axes of both bearing surfaces are at an angle to each other, then the contact point (be it between bearing surfaces or between bearing surfaces and the interposed rollers) is limited to certain areas which diametrically face each other at the axial end areas of the bearing surfaces. Inclining one bearing surface toward the other surface to only a minor degree results at first in a reduced play, which on increased inclination leads to freedom from play and finally even to a prestressed condition. Attention must be paid to the fact, of course, that this slanting on the one hand effects freedom from play but on the other hand a reduction in bearing loadability. In many cases, however, this reduction in capability is inconsequential because the actual bearing load is extremely low.

A particularly simple and efficient design of such a bearing is that of an external bearing ring which is tilted with respect to a housing bore accommodating it. In this case, the element carrying the inner bearing surface can be either the shaft itself or also an inner bearing surface fixed on the shaft.

The tilting of the external bearing ring, e.g., can be so effected that it is accommodated in a bushing made of an elastic material such as rubber, plastic or the like, the bore of which is slanted against its outer jacket surface. Depending upon the magnitude of this bore's angle of inclination against the outer jacket surface, a more or less sharp reduction in play or high preload can be achieved.

To achieve a tilting of the external bearing ring, an elastic pressure means can also be placed between the former and the bore accommodating it on a circumferential point at at least one axial end of the ring. More practical is to place the elastic pressure media on both ends of the bearing ring, namely at circumferential points diametrically facing each other. These elastic pressure media may be made out of rubber of plastic elements which are accommodated in the bearing ring and/or housing bore slots.

Such an elastic pressure medium function may, for example, be supplied by an O-ring which is accommodated in a housing bore or bearing ring eccentric slot which is so dimensioned that the O-ring tops the slot only on a minor segment of the circumferences.

In all these cases, these elastic pressure media diametrically facing each other at the end areas of the outer bearing ring affect the latter by tilting it against the axis of the bore carrying it.

While with the feasible versions described up till now, parts were added to be used for the tilting of the bearing ring, the feasibility presents itself also to develop the bearing ring itself so that it effects a tilting. This is made possible, e.g., by developing the bearing ring as a thin-walled sheet metal ring which is anchored in the housing bore at both ends with integral tip-stretched metal tongues that are so dimensioned and/or shaped that they give the bearing ring a position slanted against the housing bore.

A further possibility is to develop the bearing ring as a thin walled sheet metal ring, the bearing surfaces of which is so convex-shaped that its summit at a circumferential point is shifted to one end and at a diametrically facing circumferential point to the other end of the bearing ring. Through with this design the external bearing ring from an overall point of view fits snugly in its retainer bore, the convex-deformed supporting areas are so mutually offset against each other that the result is a semi-slanting of the external ring.

Finally, it is also feasible to anchor the bearing ring at one of its axial ends in the housing bore with an adjustable rigid element, e.g., a set screw which makes it feasible to produce a precisely defined positive or negative bearing play by a sensitive adjustment of the set screw.

Referring now to the drawings.

Figure 2:
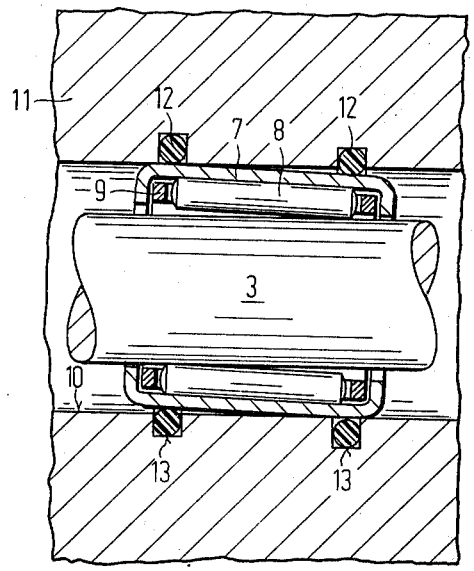
Figure 3:
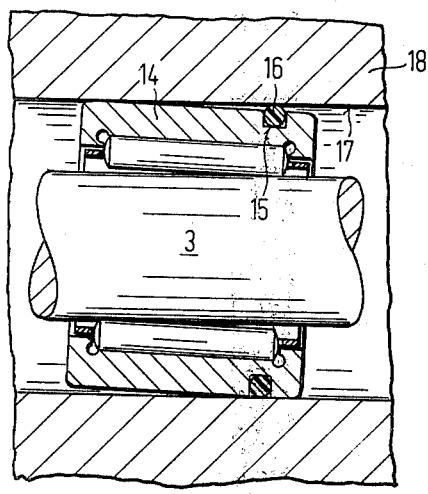
Figure 4:
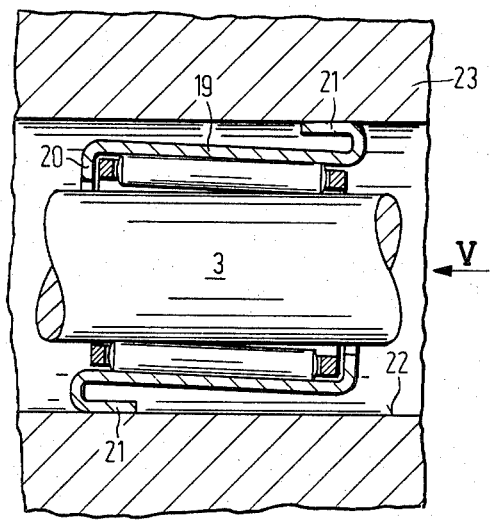
Figure 5:
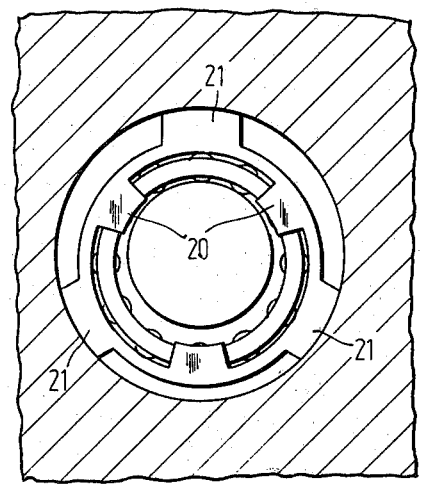

FIGS. 1 to 4 and 6 and 7 are longitudinal cross-sections of various embodiments of the bearings of the invention and FIG. 5 is a cross-section view of FIG. 4 in the direction of arrow V.

In FIG. 1, the bearing consists of outer bearing race 1 in which cylindrical rollers 2 roll and the inner bearing raceway is formed by the shaft 3 itself. Outer bearing race 1 is retained by a bushing 4 made of elastic material such as rubber, plastic or the like which in turn is seated in bore 5 of housing 6. The bore of bushing 4 which retains outer bearing race 1 is slanted against its outer jacket surface so that the outer bearing race 1 is tilted against bore 5. This way, as FIG. 1 shows in an exaggerated fashion, the cylindrical rollers 2 contact the surface of shaft 3 only at the opposite ends. Thus, freedom from play is achieved among outer bearing race 1, rollers 2 and shaft 3.

In FIG. 2, the outer bearing race 7 is from a thin-walled sheet metal tube. In the latter bearing, needles rollers 8 are accommodated in a cage 9. Outer bearing race 7 is secured in bore 10 of housing 11 via O-rings which are so accommodated in eccentric slots 13 of housing 11 that they project from these slots only at diametrically opposed points and that way tilt the outer bearing race 7.

In FIG. 3, a variant is shown where outer bearing race 14 is formed as a thick-walled type and is equipped with a revolving eccentric slot 15 in which an O-ring is arranged by which outer bearing race 14 is secured in the bore 17 of housing 18.

In FIGS. 4 and 5 the outer bearing race 19 again is developed as a sheet metal element and in its end areas is alternatingly provided with radially inward turned flanges 20 and tongues 21 which run first radially outward and then in an axial direction over a specified area. By these tongues 21, the outer bearing race 19 is secured in bore 22 of housing 23. In this case, tongues 21 are so variously dimensioned in their radial height that outer bearing race 19 is slanted against bore 22.

Figure 6:
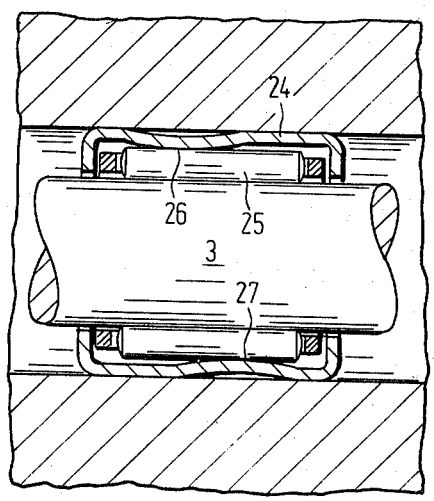

FIG. 6 illustrates a variation wherein sheet metal outer bearing race 24 is convex-developed in the race area for bearing needles 25 and summits 26 and 27 of the convex race are at diametrically facing circumferential points so offset against opposing ends of bearing race 24, that the same conditions are produced as if the entire outer bearing race 24 were tilted.

Figure 7:
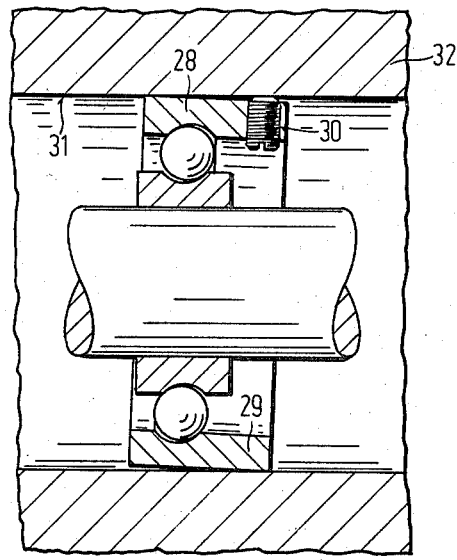

Finally, FIG. 7 illustrates an embodiment with a roller bearing, the outer bearing race 28 of which is equipped in a longitudinal direction with an extension 29 in which area a radial set screw 30 is arranged. By a more or less intensive screwing of offset screw 30, it is possible to impart to the external bearing race 28 any desired and required inclination against the bore 31 of housing 32.

The exemplified embodiments all relate to roller bearings but it is contemplated, without departing from the inventive conception, to develop these as slide bearings so that the rollers can be deleted and the inner and outer bearing faces can come directly into sliding contact with each other. It is equally contemplated to replace the described bearings for rotary motions with bearings for longitudinal motions, e.g., by ball tubes.

It is also within the scope of the invention to snugly fit the outer bearing ring into a bore if the axis of this bore is inclined to the axis of the shaft. On supporting a shaft, for example, by two bearings spaced apart from each other, both bore sections retaining the outer bearing rings can be arranged parallel to each other by offset-positioning them by a specific amount. But these bore sections can be arranged also to the effect that their axes are angular-inclined to each other. The latter case can be easily realized by arranging the external bearing rings in a tube, the longitudinal axis of which is curved. It is to be understood that the invention is intended to be limited only as defined in the appended claims.

I claim:

1. A play-free rolling bearing for low loads and low rpms comprising two structural elements carrying inner and outer raceways with interposed rolling elements, one structural element carrying one of the raceways being inclined to the other structural element so that the axes of both raceways are at an angle to each other.

2. A bearing of claim 1 wherein one element is an outer bearing ring tilted against a housing bore accommodating it.

3. A bearing of claim 2 wherein the bearing ring is disposed in a bushing made of elastic material provided with a bore, the bore of the bushing being slanted against its outer jacket surface.

4. A bearing of claim 2 wherein an elastic pressure element is placed between the bearing ring and the housing bore on at least one axial end.

5. A bearing of claim 4 wherein the bearing ring is provided at both ends with elastic pressure elements at circumferential points diametrically facing each other.

6. A bearing of claim 5 wherein the bearing ring is made of thin-walled sheet metal and is secured in the housing bore at both ends thereof by integral tip-stretched sheet metal tongues which are shaped to give the bearing ring a slanted position against the bore.

7. The bearing of claim 4 wherein the elastic pressure element is accommodated in a slot of the bearing ring.

8. A bearing of claim 4 wherein the elastic pressure element is an O-ring accommodated in an eccentric slot of the bearing ring dimensioned so that the O-ring extends out of the slot on only a minor segment of the circumference.

9. The bearing of claim 4 wherein the elastic pressure element is accommodated in a slot of the housing bore.

10. The bearing of claim 4 wherein the elastic pressure element is an O-ring accommodated in an eccentric slot of the bearing ring dimensioned so that the O-ring extends out of the slot on only a minor segment of the circumference.

11. A bearing of claim 2 wherein the bearing ring is made of thin-walled sheet metal with a convex-shaped surface whereby its summit at one circumferential point is offset toward one end and at a diametrically opposed circumferential point is offset toward the other end of the bearing ring.

12. A bearing of claim 2 wherein the bearing ring is secured at one of its axial ends in the housing bore with an adjustably rigid element.

* * * * *